W. L. BONNEY.
CELERY CULTIVATOR.
APPLICATION FILED AUG. 5, 1907.

908,645.

Patented Jan. 5, 1909.
4 SHEETS—SHEET 1.

Witnesses:
A. L. McGee
A. T. Dimond

Inventor.
Walter L. Bonney
By Wilhelm, Parker & Hart
Attorneys.

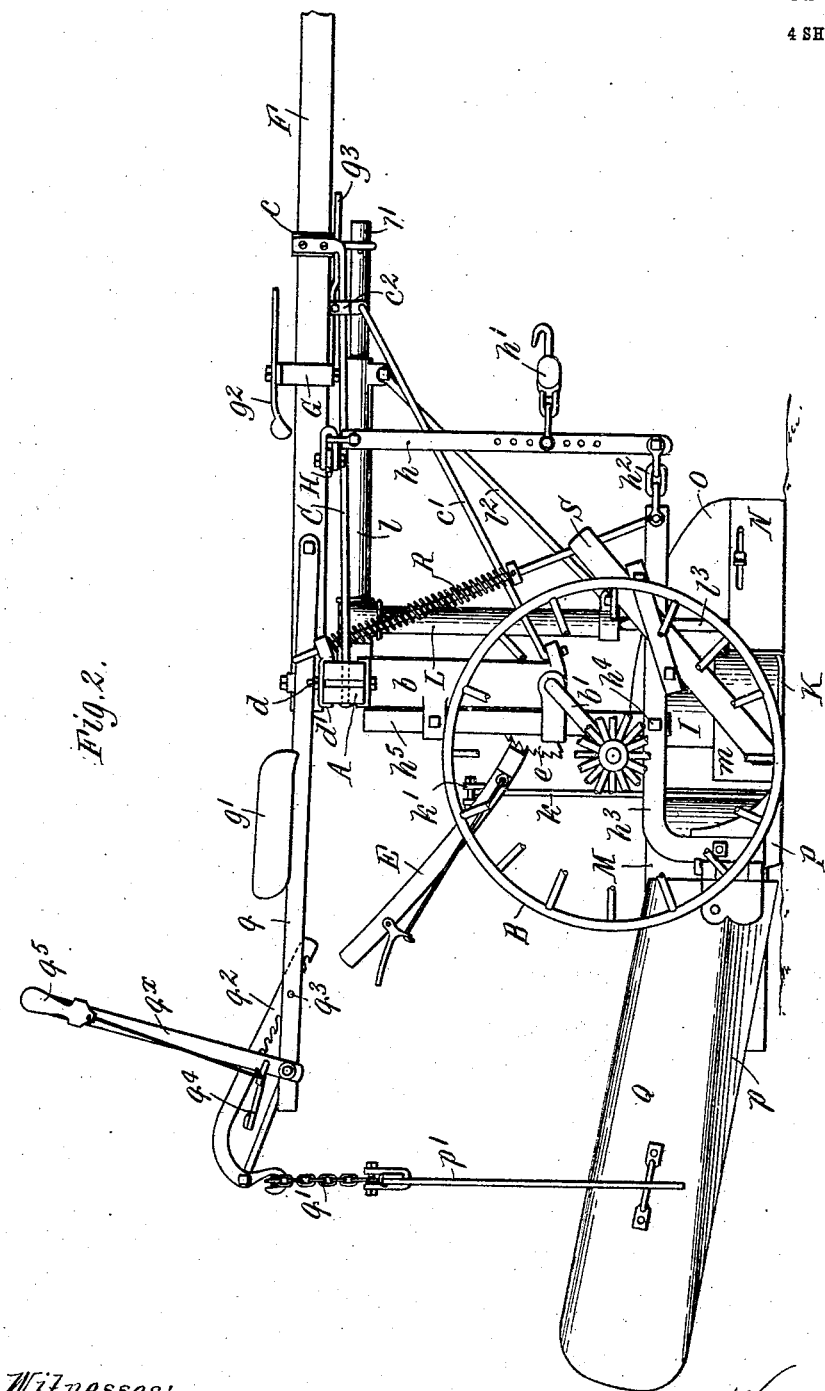

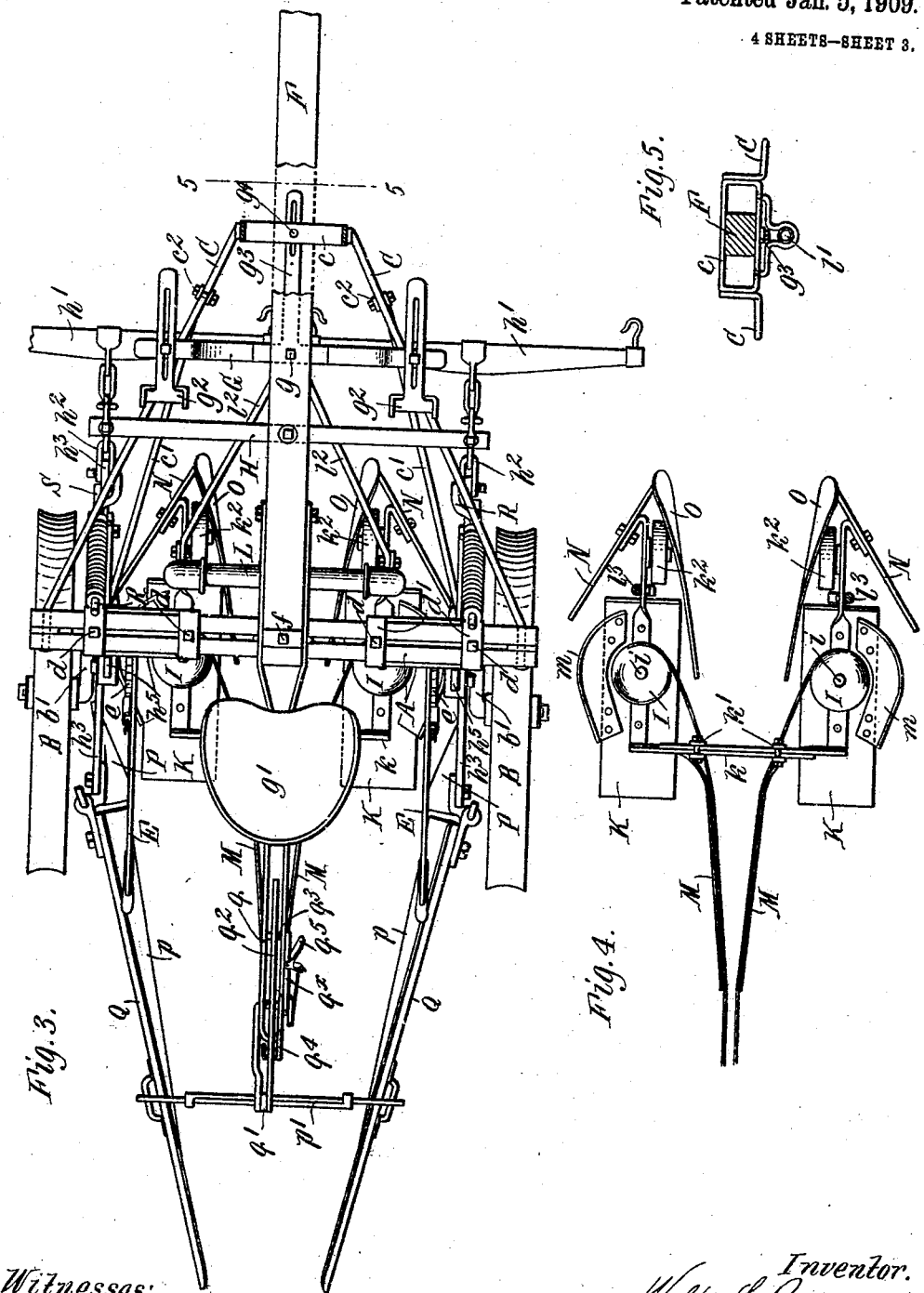

W. L. BONNEY.
CELERY CULTIVATOR.
APPLICATION FILED AUG. 5, 1907.

908,645.

Patented Jan. 5, 1909.

4 SHEETS—SHEET 4.

Witnesses:
A. L. McGee.
A. G. Dimond.

Inventor:
Walter L. Bonney
By Wilhelm, Parker & Hurd
Attorneys.

UNITED STATES PATENT OFFICE.

WALTER L. BONNEY, OF BATAVIA, NEW YORK.

CELERY-CULTIVATOR.

No. 908,645.　　　Specification of Letters Patent.　　　Patented Jan. 5, 1909.

Application filed August 5, 1907. Serial No. 387,133.

*To all whom it may concern:*

Be it known that I, WALTER L. BONNEY, a citizen of the United States, residing at Batavia, in the county of Genesee and State of New York, have invented a new and useful Improvement in Celery-Cultivators, of which the following is a specification.

This invention relates to cultivators or agricultural implements used in the cultivation of celery.

In growing celery, especially the early variety, it is necessary to protect the plants against the heat of the summer sun to properly bleach the stalks and improve their quality. Heretofore this has been accomplished by placing boards on opposite sides of the rows of plants, and by banking the earth up against the plants. The former method, in addition to being expensive is troublesome, as the boards are cumbersome and heavy to handle; and the later method is objectionable in that the earth is a poor non-conductor of heat and stains the stalks which also collect and hold more or less of the soil and grit.

The primary object of this invention is to lessen the expense and work of celery cultivation and improve the quality of the celery by providing a machine or cultivator furnished with means for laying webs or strips of thin flexible material which is a good non-conductor of heat, such as paper, along the opposite sides of the row of plants to protect the stalks from the heat of the sun and from direct contact with the earth. To this end the machine or implement hereinafter described as an embodiment of the invention, is provided with rolls of paper, or other suitable thin flexible material, which is paid out and laid along side of the plants on opposite sides of the row as the machine is drawn along, and with bankers or devices for banking the earth up against the non-conducting webs to retain the later in place and provide the necessary hills or banks for the plants.

Another object of the invention is to produce an efficient celery cultivator having the practical and desirable structural features hereinafter described and set forth in the claims.

Figure 1:
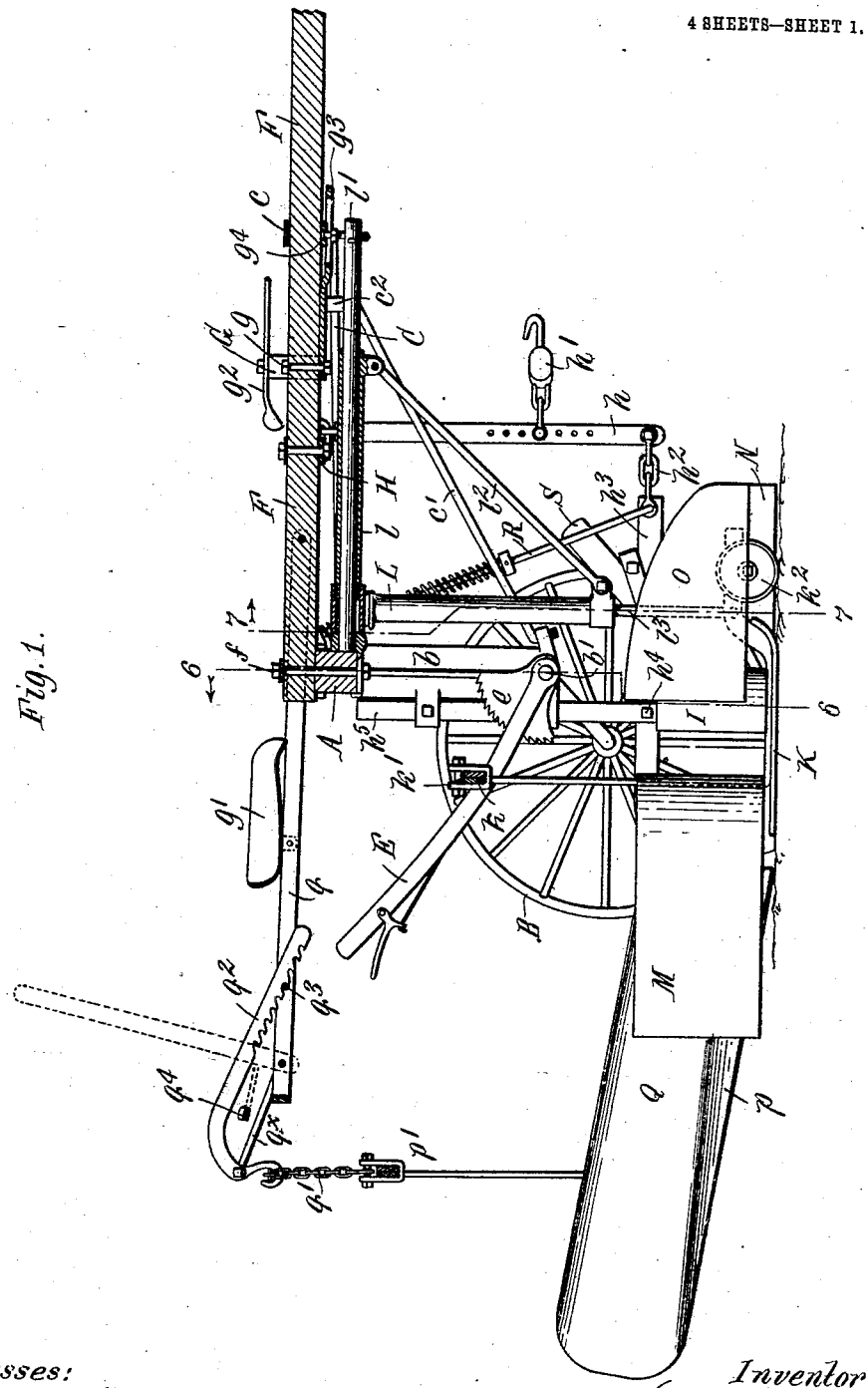
Figure 6:
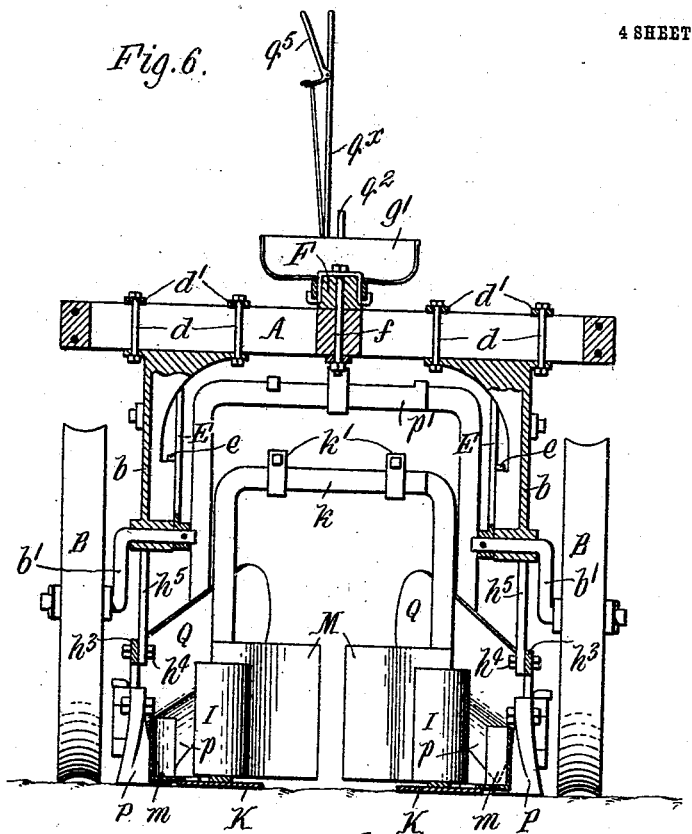
Figure 7:
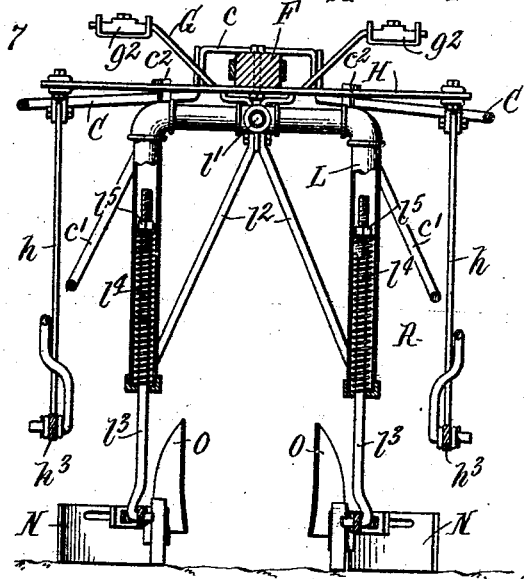

In the accompanying drawings, consisting of four sheets: Figure 1 is a central longitudinal sectional elevation of a celery cultivator embodying the invention. Fig. 2 is a side elevation thereof, with one wheel partly broken away to disclose the parts inside of the same. Fig. 3 is a plain view thereof. Fig. 4 is a plan view, partly in horizontal section, showing the web support, guiding and protecting means. Fig. 5 is a cross section of the machine in line 5—5, Fig. 3. Fig. 6 is a transverse sectional elevation of the cultivator, in line 6—6, Fig. 1. Fig. 7 is a transverse sectional elevation thereof in line 7—7, Fig. 1.

Like letters of reference refer to like parts in the several figures.

The cultivator is of the straddle row type and the several parts of the machine are carried by a wheeled sulky of some suitable construction. The frame of the sulky illustrated in the drawings comprises a cross bar A provided at opposite sides with a pair of depending legs or hangers $b$ having suitable bearings at their lower ends for crank axles $b'$ on which the ground wheels B are journaled, side rods or bars C which are secured to the cross bar A and converge forwardly to a connecting tongue loop or guide $c$, and inclined braces or rods $c'$ which are secured to the lower ends of the bearing hangers $b$ and are connected by clips $c^2$ or other means to the front portions of the side rods C. The bearing hangers are preferably adjustable laterally on the cross bar of the frame, for which purpose, in the construction shown, the cross bar is made of two spaced timbers, and the hangers are adjustably secured thereto by vertical bolts $d$, Figs. 2, 3 and 6, passing between said timbers and through the hangers and saddle plates $d'$ on top of the cross bar. The braces $c'$ being adjustable forwardly and rearwardly on the side rods C do not interfere with the lateral adjustments of the bearing hangers $b$.

E represents levers attached to the crank axles for turning them in their bearings to regulate the height of the machine. The levers are provided with ordinary holding dogs coöperating with toothed segments $e$ on the bearing hangers for holding the axles in adjusted positions.

F represents a tongue or pole which is suitably pivoted at its rear end to the cross bar A by a king pin or bolt $f$, Figs. 1 and 2, or in any other suitable way, and projects forwardly through the loop or guide $c$ so that the tongue is permitted a limited lateral swinging movement relative to the sulky frame.

G, Figs 1–3 and 7, is a transverse steering bar or lever which is pivoted centrally to the tongue, for instance, by a pin or bolt $g$, in front of the driver's seat $g'$ and is provided at opposite ends with foot rests or stirrups $g^2$ within reach of the driver's feet, and has a forwardly-projecting arm $g^3$, the front end of which has a pin and slot or other suitable slide connection $g^4$ with the tongue loop or guide $c$. By turning the steering bar G on its pivot the sulky can be swung laterally on the king pin $f$ into a more or less angular relation to the tongue and thus caused to properly follow the row of plants.

H represents a transverse horizontal draft equalizer bar pivoted between its ends to the center pole of the sulky and provided at its outer ends with hanging draft bars $h$ to which the swingle-trees or other draft devices $h'$ are adjustably connected. The lower ends of the hanging draft bars are connected, for example, by chains $h^2$, to the front ends of plow beams $h^3$ which are pivoted by bolts $h^4$, or otherwise, to the lower ends of upright posts $h^5$ which are secured to and vertically adjustable on the bearing hangers $b$.

The parts thus far described constitute the carriage for the web supplying, cultivating and banking appliances, and while the construction thereof described is considered desirable, the same may be of other known or suitable construction without departing from the scope of my invention.

I represents a roll of paper or analogous thin flexible material which is a good non-conductor of heat. In practice, two webs are simultaneously placed along the opposite sides of the row of plants, and for this purpose two of the rolls I are provided. They are located at opposite sides of the lower central portion of the machine so as to be on opposite sides of the row of plants straddled by the machine, and are rotatably supported in substantially upright position, so that the webs can be paid out from the rear of the machine in upright position to stand on edge against the opposite sides of the row of plants. In the machine illustrated, the web rolls are journaled on upright spindles $i$ secured to and rising from supporting drags or trucks K consisting of shoes or runners with upturned front ends and which are connected by a yoke $k$ having upright legs provided at their lower ends with horizontal feet or portions to which the runners are secured, and at their upper ends with horizontal arms adjustably connected by clips $k'$ whereby the drags can be properly spaced or adjusted relative to the sides of the row of plants. Wheels $k^2$ are also journaled in suitable bearings on the supporting feet for the runners, in front of the runners, see Figs. 1 and 4.

The drags are preferably connected to the sulky by an inverted U-shaped or arched frame L made of pipes and provided at its upper central portion with a forwardly-projecting pipe or sleeve $l$ which surrounds and is adapted to slide fore and aft of the machine on a central horizontal rod $l'$ suitably secured at its front and rear ends to the sulky frame. Inclined brace rods $l^2$ connect the front end of the sleeve $l$ with the lower ends of the legs of the arch frame L to properly brace the frame. Upright rods $l^3$, Fig. 7, hooked or otherwise attached at their lower ends to the front portions of the drags K, extend up into the legs of the arch frame L, and coil springs $l^4$ surrounding these rods in the legs of the frame L and bearing at opposite ends against parts at the lower ends of said legs and adjustable nuts $l^5$ on the upper ends of the rods $l^3$ yieldingly support the drags and allow them the rise and fall in riding over the surface of the ground. The drags are held in the desired relation to each other by the connecting yoke $k$; but the movable supporting rods $l^3$ and the arched frame L, which is free to swing or tilt on the rod $l'$, allow sufficient up and down movement of the drags to properly follow and ride over rough ground. The arched frame also, being movable fore and aft of the machine, enables the machine to back a short distance without moving the drags backward, which prevents the paper webs from stacking and twisting which is apt to result in the earth getting in between the plants and the paper, and in the paper being torn when the forward motion of the machine is continued.

The non-conducting webs are held in upright position and properly directed as they are paid out by suitable means consisting, in the construction shown, see Figs. 1, 4 and 6, of rearwardly-extending converging guide plates M which are secured at their front ends to the legs of the yoke $k$. The tail ends of the guide plates move along on opposite sides of the plants and serve to lay the non-conducting webs, which pass rearwardly out between the guide plates up against the opposite sides of the row of plants. The guide plates are preferably made of thin flexible metal.

$m$, Figs. 2 and 4, represents upright guards which are fixed to the drags and partially surround the web rolls on their outer sides to prevent earth, stones or other matter from striking and injuring the webs.

N represents scrapers which are mounted in front of the drag runners on forward extensions of the horizontal portions of the yoke $k$ and diverge rearwardly at the outer sides of the runners. These scrapers divert loose clods, stones and the like outwardly from in front of the runners and prevent the same from working in between the paper webs and the plants. Leaf gatherers O are attached at their front ends to the front ends of the scrapers and converge rearwardly therefrom, the front ends thereof flaring outwardly and upwardly. These gatherers lift up the spreading and drooping leaves or stalks of the plants and hold them upright until they are engaged and held by the paper webs.

The earth is banked or thrown up against the paper webs to hold the same in place and form the bank by suitable banking devices. In the machine shown, these devices consist of two plows P secured to the depending rear ends of the plow beams $h^3$ and arranged outside and to the rear of the drags K, and wings or boards Q which converge rearwardly from the plows. The plows dig up and turn the earth inwardly, and the wings following along behind the plows gradually move it over toward and bank it up against the two webs along the opposite sides of the row of plants. The banking wings preferably have inbent lower portions $p$ and are hinged at their front ends to the depending parts of the plow beams in rear of the plows so that they can swing horizontally. An upright yoke $p'$ connects the rear portions of the banking wings to hold them at a fixed distance apart and cause them to swing together, the yoke being adjustable in width similarly to the yoke $k$ connecting the drags, for regulating the distance between the banking wings. The yoke is slidably connected to the banking wings so that they can rise and fall independently thereof, and is suspended from a suitable adjusting device for regulating the height of the same and the plows O. The adjusting device shown consists of an L-lever $q^x$ fulcrumed at its angle on a rearward extension $q$ of the tongue and having a rearwardly extending arm attached by a hook chain $q'$ to the yoke $p'$. A toothed dog $q^2$ pivoted to the outer end of the lever is adapted to engage a holding pin $q^3$ on the tongue extension, and a dog lifter $q^4$ pivoted on the lever and having an operating handle $q^5$ is provided for releasing the dog. Any other suitable adjusting means for the banking plows and wings could be employed.

Suitable means are provided for counterbalancing the banking plows and wings, such, for instance, as ordinary spring-pressed rods R, Figs. 1–3, connecting the front ends of the plow beams to the sulky frame.

S, Fig. 2, represents a sharp-edged inclined colter or blade secured to each plow beam for cutting roots, weeds and the like and causing the plows to ride over stones, stumps, &c.

The operation of the machine or implement is as follows: The ends of the webs or bands are pulled to the rear of the web guides and placed against the opposite sides of the plants at the end of a row and secured against the plants by earth, stones, or other holding means. The machine is then drawn along the row and as the webs are held they are drawn or paid out from the rolls and laid or placed in substantially upright position along the opposite sides of the plants. As the machine continues its course the banking plows and wings throw or bank the earth against the web guides, off of which it slides rearwardly against the webs or strips to partially or wholly cover the same and hold them in position against the plants, and at the same time cultivating or turning up the earth and forming the bank for the row of plants.

A straddle row machine, such as described, is preferable because the webs are placed and the earth banked simultaneously against opposite sides of the plants, thereby preventing the plants from being pressed over to one side or broken. If desired, however, the webs and earth can be placed first along one side of the row and thereafter along the opposite side.

In this application is shown and described the construction of the machine which, at this time, is believed to be most practical, but I believe I am the first to protect and bleach celery by flexible webs or strips of paper, or other suitable non-conducting material, which are laid and secured along side of the row of plants by a machine as it is moved along the row, and manifestly the means employed for supporting and delivering the webs, for covering or securing them in place beside the plants, and the various other features of the machine could be arranged and constructed in various different ways and yet be within the scope of my invention.

I claim as my invention:

1. In an implement for the purpose stated, means for delivering a flexible web or strip along side of the row of plants and securing the same in position as the implement is moved along the row, substantially as set forth.

2. In an implement for the purpose stated, the combination of means for paying out a flexible web or strip alongside of the row of plants as the implement is moved along the row, and means for banking earth against said web or strip to hold it in place, substantially as set forth.

3. In an implement for the purpose stated, the combination of means for delivering flexible webs or strips along the opposite sides of the row of plants as the implement is moved along the row, and means for securing the webs or strips to hold them in place, substantially as set forth.

4. In an implement for the purpose stated, the combination of means for rotatably supporting a roll of flexible material whereby the material is paid out alongside of the row of plants as the implement is moved along the row, and means for securing the web or strip of material in position alongside of the row of plants, substantially as set forth.

5. In an implement for the purpose stated, the combination of means for rotatably supporting a roll of flexible material whereby the material is paid out alongside of the row of plants as the implement is moved along the row, and means for banking earth against said material to hold it in place, substantially as set forth.

6. In an implement for the purpose stated, the combination of means for rotatably supporting a roll of flexible material in a substantially upright position, whereby the material is paid out vertically alongside of the row of plants as the implement is moved along the row, and means for banking earth against said material to hold it in place, substantially as set forth.

7. In an implement for the purpose stated, the combination of means for paying out a flexible web or strip as the implement is moved along the row of plants, means for directing the web alongside of the plants in an upright position, and means for securing said web in position, substantially as set forth.

8. In an implement for the purpose stated, the combination of means for paying out a flexible web or strip as the implement is moved along the row of plants, a guide plate for directing the web alongside of the plants in an upright position, and means for placing earth against said web to hold it in place, substantially as set forth.

9. In an implement for the purpose stated, the combination of means for paying out a flexible web or strip as the implement is moved along the row of plants, means for placing earth against said web to hold it in place, and a guide for directing the web along side of the plants in an upright position, said guide being arranged between the web and the means for placing earth against the web whereby the guide temporarily receives the pressure of the earth and relieves the web from such pressure and prevents injury to the same, substantially as set forth.

10. In an implement for the purpose stated, the combination of means for paying out two flexible webs or strips as the implement is moved along the row of plants, rearwardly converging upright guides along the inner sides of which the webs pass and which direct the webs or strips against the opposite sides of the row of plants in upright position, and means for banking earth against said guides and webs to hold the latter in place, substantially as set forth.

11. In an implement for the purpose stated, the combination of means for paying out two flexible webs or strips as the implement is moved along the row of plants, rearwardly converging upright guides along the inner sides of which the webs pass and which direct the webs or strips against the opposite sides of the row of plants in upright position, and banking devices at opposite sides of the said guides for banking the earth against the webs or strips to hold them in place, substantially as set forth.

12. The combination of a carriage, a web or strip support connected thereto and movable relative to the carriage, means on said support for paying out a flexible web or strip as the carriage is moved along the row of plants, and means for banking earth against the web to hold it in place, substantially as set forth.

13. The combination of a carriage, drags loosely connected to the carriage to move relative thereto, means connecting the drags to maintain the same relation between them, means carried by said drags for paying out flexible webs or strips as the carriage is moved along the row of plants, means carried by the drags for directing the webs or strips against the opposite sides of the row of plants in upright position, and means for banking earth against the webs or strips, substantially as set forth.

14. The combination of a carriage, drags loosely connected to the carriage to move fore and aft relative thereto, means connecting the drags to maintain the same relation between them, means for paying out flexible webs or strips as the carriage is moved along the row of plants, rearwardly - extending guides which direct the webs or strips against the opposite sides of the row of plants in upright position, and means for banking earth against the webs or strips, substantially as set forth.

15. The combination of a carriage, an arched drag frame mounted to move fore and aft and swing sidewise on said carriage, drags movably connected to said frame, means carried by said drags for paying out flexible webs or strips as the carriage is moved along the row of plants, means for directing the webs or strips against the opposite sides of the row of plants in upright position, and means for banking earth against the webs or strips, substantially as set forth.

16. The combination of a carriage, means for paying out flexible webs or strips along the opposite sides of the row of plants as the carriage is moved along, and means for banking earth against said webs or strips comprising plows at opposite sides of said webs or strips, banking wings which converge rearwardly from said plows and are mounted to move laterally, and means for adjusting said banking plows and wings vertically, substantially as set forth.

17. In an implement for the purpose stated, the combination of means for paying out a flexible web or strip alongside of the plants as the implement is moved along the row, a scraper arranged in front of said means, and means for banking earth against said web or strip, substantially as set forth.

18. In an implement for the purpose stated, the combination of means for paying out a flexible web or strip alongside of the plants as the implement is moved along the row, a leaf gatherer arranged in front of said means, and means for banking earth against said web or strip, substantially as set forth.

19. In an implement for the purpose stated, the combination of means for paying out a flexible web or strip alongside of the plants as the implement is moved along the row, a scraper and a leaf gatherer arranged in front of said means, and means for banking earth against said web or strip, substantially as set forth.

20. In an implement for the purpose stated, the combination of means for paying out a flexible web or strip alongside of the plants as the implement is moved along the row, a guard for protecting said web or strip, and means for banking earth against said web or strip, substantially as set forth.

21. The combination of a carriage, means for delivering a flexible web or strip alongside of the row of plants and securing it in position as the carriage is drawn along the row, a tongue pivoted to said carriage, and a steering bar pivoted to said tongue and having an arm connected to said carriage, whereby the latter can be turned into angular relation to said tongue, substantially as set forth.

Witness my hand, this 31 day of July, 1907.

WALTER L. BONNEY.

Witnesses:
WALTER W. WARE,
FRANK J. COOK.